United States Patent
Felden

[15] 3,648,750
[45] Mar. 14, 1972

[54] VEHICLE TIRE REPAIR BODY

[72] Inventor: Alois Felden, Munich, Germany

[73] Assignee: Stahlgruber Otto Gruber & Company, Munich, Germany

[22] Filed: Jan. 31, 1969

[21] Appl. No.: 795,640

[30] Foreign Application Priority Data

Feb. 2, 1968 Germany .................. P 16 80 519.9

[52] U.S. Cl. ........................................... 152/370
[51] Int. Cl. .............................. B60c 21/02, B60c 21/06
[58] Field of Search .................................. 152/367, 370

[56] References Cited

UNITED STATES PATENTS

| 684,647 | 10/1901 | Madsen | 81/15.7 |
|---|---|---|---|
| 1,631,354 | 6/1927 | Ayers | 152/367 |
| 3,143,156 | 8/1964 | Fagert et al. | 152/370 |
| 3,282,320 | 11/1966 | Klouza | 152/370 |
| 3,335,779 | 8/1967 | Gruber | 152/370 |
| 2,230,660 | 2/1941 | Wedler | 152/370 |
| 2,852,058 | 9/1958 | Chambers et al. | 152/367 |
| 3,342,240 | 9/1967 | Williams | 152/370 |

OTHER PUBLICATIONS

The Vanderbilt Rubber Handbook, R. T. Vanderbilt Co., 230 Park Ave., New York, 1958, T S 1890 V. 3, pp. 240.

Primary Examiner—Arthur L. LaPoint
Assistant Examiner—Robert Saifer
Attorney—Connolly and Hutz

[57] ABSTRACT

A repair body for damaged vehicle tires includes a stem portion and a patch portion. The stem is of uniform cross section over the largest part of its length and is larger than the canal-like injury which it fills. At the juncture or transition section of the stem and patch the stem is tapered or recessed. Additionally, the stem is made of a plurality of layers or varying hardness arranged spirally or concentrically about the stem axis.

22 Claims, 9 Drawing Figures

VEHICLE TIRE REPAIR BODY

BACKGROUND OF INVENTION

This invention relates to a repair body, especially for the repair of larger damaged areas in motor vehicle tires, where the damaged area is widened to a canal form and is filled in with the stem of the repair body, with a patch disc having a reinforcement insert firmly connected to the stem to firmly bridge the damaged area.

The development of this invention proceeded from repair bodies for the repair of small nail punctures in tubeless tires (German published application No. 1,155,992), where a mushroom-shaped repair body was pulled into the damaged spot. There the stem of the repair body filled out the puncture canal, while the shield attached thereto adhered to the interior of the tire.

The difficulties involved in the correct funnel-shaped cutting out and filling out of large damaged areas created a need for a solution which would simplify this preparation and would allow for an appropriate damage repair even with the help of semi-skilled workers.

A patch was therefore disclosed (German published application No. 1,239,953), wherein the puncture canal or injury prepared in the above-mentioned manner is filled with the stem of the repair body and the damaged area is bridged by a disc-like patch section with reinforcing inserts. The usefulness of this patch is limited, however, to damaged areas with the maximum diameter of about 10 mm., since in practice with respect to large damaged areas, due to the fulling action of the tires becoming more elastic and soft in the course of further development, the hard core, embedded in the pliable material bridging over the break in the tread surface, moves so intensely in its enclosure that it is destroyed in a relatively short time.

Even the apparently obvious solution, the omission of the soft embedding to make the entire stem of a harder and more rub-off stable rubber, leads to no success, since due to the deformation of the stem in the pulling in and due to the tendency of the elastic rubber to return to its original shape, it cannot be avoided that after the pulling in of the stem into the damaged spot an annular hollow chamber is formed at the transition between the stem and patch disc which in operation leads to a peeling of the patch disc.

This is understandable when one considers that the stem of the repair body in comparison to the damaged area to be filled must be prepared oversize in order to assure the puncture being sufficiently filled and also that it does not become detached from the wall of the canal due to the filling action during driving and the thus connected deformation of the filled-in puncture canal. In a thick shaft, a relatively great force is therefore necessary in order to pull the stem into the prepared punched canal, the stem being stretched in a longitudinal direction and due to its elasticity being pulled together at right angles.

After the pulling in of the repair body into the damaged area, which can take place only up to the installation of the patch disc at the inner wall of the tire, the force effect working outwards and stretching the stem ends, and the rubber—as a result of its elasticity—has the tendency to return to its original shape, i.e., to resume its original diameter in the stem area. However, because of the above-mentioned reasons of absolute fail-safety of the filling out the canal for all deformation aspects occurring in operation, the considerably smaller diameter of the punched canal as compared to the stem diameter is opposed to this tendency, so that a reciprocal effect sets in between the rubber of the stem and the tire surrounding the punched canal, whereby the canal is somewhat extended and the stem is compressed. This leads then to the fact that the rubber of the stem has a tendency to yield in the directions where it finds little or no resistance, i.e., at both ends of the punched canal. It pushes out to a certain extent at the ends of the punched canals, although this cannot be seen from the outside of the tire of course, since here the pulled in shaft at first extends past the tire surface anyway and must first be evened out with a knife.

At the tire interior this swelling out is obvious and causes the patch (at this point not yet vulcanized) to become loose from the tire interior in the immediate proximity of the punched canal resulting in an annular hollow space, which as already mentioned causes the loosening or the destruction of the patch disc bridging the strength of the tire broken down by the damaged area.

This can be observed if a thick stem without patch disc is inserted into a corresponding punched canal to a point where its end surface coincides with that of the interior side of the tire. It is noticed that during the pulling in this surface is planar or even arches into the punched canal, but immediately after releasing at this surface the pulling force directed outwards, there occurs an arching out of the punched canal, which is that much greater in proportion the greater the stem diameter and the oversize required for this stem diameter as compared to the punched canal.

Since the previously known measures could not solve the problem of the occurrence of a hollow space at the transition between stem and patch disc with respect to large stem diameter, it is now the object of the invention to eliminate this disadvantage definitely even with respect to large repair places.

SUMMARY OF INVENTION

The invention concerns therefore preferably repair bodies for the repair even of large damaged areas in motor vehicle tires, although the advantages of the invention are suitable of course for small damaged areas, i.e., by using a relatively thin stem.

For the solution of this problem, the stem of the repair body has a uniform cross-section over the largest part of its length, larger than that of the canal or injury to be filled, yet has in the proximity of the transition to the patch disc a tapering or recess and/or the stem of the repair body consists of a plurality of layers, proceeding in the direction of the stem axis, made of rubber of varying hardness which are preferably arranged spirally or concentrically about the stem axis.

Under the most advantageous circumstances, e.g., with stem diameters under 50 mm., each of the two alternative characteristics is already suited to avoid a hollow space resulting in the proximity of the punched canal. With respect to very large repair bodies, i.e., with stem diameters of more than 50 mm., for example, or even with particularly intense stress on the tire or with particularly flexible tire, however, only the combination of both characteristics assures satisfactory repair.

THE DRAWINGS

DETAILED DESCRIPTION

With respect to the Figures, it is noted that they are not according to scale and particularly the layer construction and the thickness of the binding layer are illustrated in an exaggerated manner for a better understanding of the problems underlying this invention.

Figure 1:
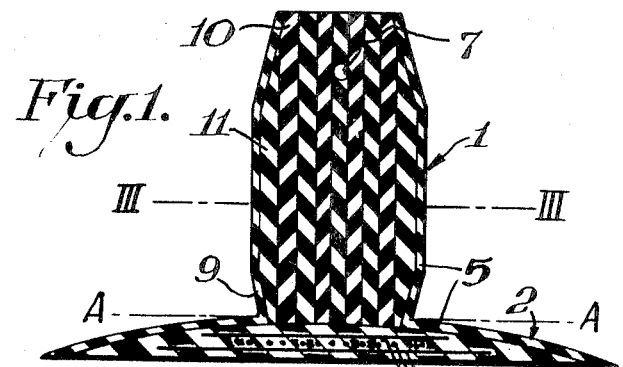
FIG. 1 is a longitudinal section through a form of construction of a novel repair body.
Figure 2:
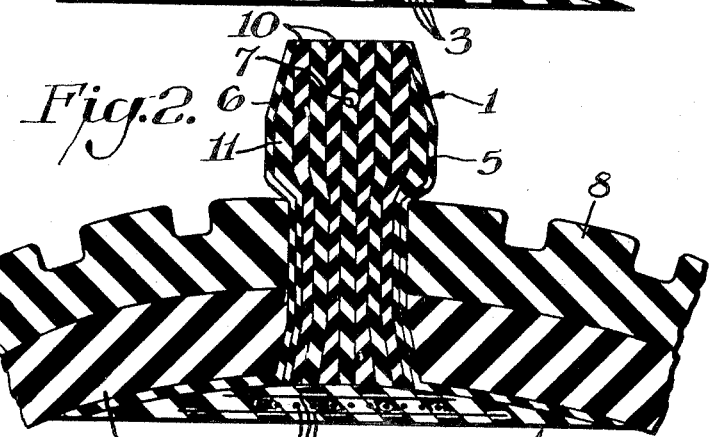
FIG. 2 shows the repair body of FIG. 1 after the insertion into a punched canal.
Figure 3:
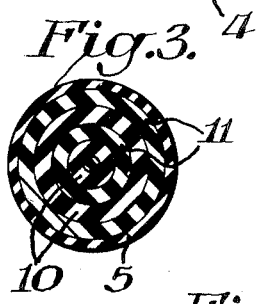
FIG. 3 is a cross-sectional view through the stem of a novel repair body, along the line III—III in FIG. 1.

The repair body according to FIGS. 1 to 3 consists in a known manner of a stem 1 and a patch disc 2 which by means of its reinforcing inserts 3, consisting of cord fibers for example, bridges over the strength of tire carcass 4 broken down by the damage.

Both stem 1 as well as patch disc 2 are, as usual, covered by a thin binding layer 5 of unvulcanized, vulcanizable rubber in order to produce in the course of cold vulcanizing a solid binding between repair body and tire.

As seen from FIG. 1, stem 1 has over a considerable part of its length a uniform, preferably cylindrical (FIG. 4) or nearly cylindrical cross-section although of course other cross-section forms, such as oval or even rectangular cross-sections of the stem, are also possible.

Figure 6:
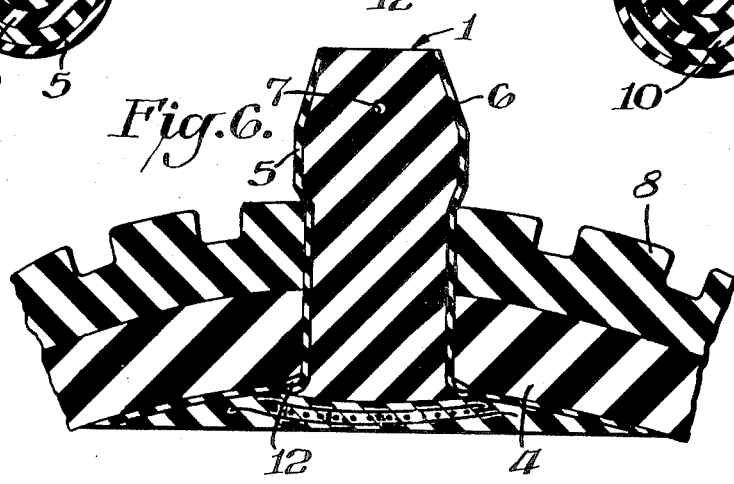
FIG. 6 is a longitudinal section of a repair body inserted in a punched canal using the compensating ring of FIG. 5.

As seen from FIGS. 2 and 6, the stem is oversize in comparison to the punched canal or injury to be filled in the tire, so that after the insertion of this, for example, annularly cut-out and roughened canal, prepared in a known manner, there sets in a reciprocal action between the canal wall and the stem which somewhat widens the canal and compresses the stem.

In order to pull the stem into the narrow punched canal, the free end 6 of the stem is made conical, the outer diameter of the resulting cone stump being essentially smaller than the diameter of the punched canal. A penetrating boring 7 serves for the attachment of an insertion tool by means of which the novel repair body can be pulled into the punched canal, for which purpose in repair bodies for the repair of large damages, i.e., for example with diameters of the punched canals of about 50 mm. and above, where for the oversize of the stem required for a solid seating, considerable force is to be applied, which leads to the already described elongation of the stem during pulling in under simultaneously passing cross-section decrease.

Since the stem in such large injuries in the tire must not only fill out the punctured canal but must also replace the rub-off fast protective rubber, e.g., the tread surface 8, it is not suitable to make the stem simply of a particularly soft rubber mixture (whose elastic plasticity can follow and equalize the deformations occurring during operation of the puncture canals) which is cylindrical in its rest position. Such soft rubber would be destroyed in a short time by the rough street surface as well as by small foreign bodies (gravel, glass splinters) which could penetrate into it.

Similarly the afore-noted suggestion to provide the stem with a hard core surrounded by a buffer layer of soft rubber does not lead to success in large stem diameters, since the core, moving freely within the buffer layer, is used up considerably faster by this possible movement than the tread of the tire, so that in large damaged spots in a short time both the repair body bridging the tread as well as the tread itself in the close proximity of the puncture canal are damaged.

A very thin buffer layer, corresponding to at most 0.5 to 1 mm. thick binding layer, which surrounds a hard core, however, is not suitable for the large stem diameters forming the basis of the invention since such a thin buffer layer cannot compensate the considerable difference in diameters between puncture canal and stem.

However, if a stem of relatively hard and rub-off fast rubber in the necessary oversize is pulled into the puncture canal, as already mentioned, this has the result that after the release of the pulling forces required for insertion the stem contracts axially and expands radially as far as possible, which at both ends of the puncture canals (i.e., at the tire exterior and interior sides) leads to a swelling out of the stem material, even when the inner surface of the stem after the insertion was at first flush with the interior surface of the tire. This swelling out and the thereby resulting formation of an annular hollow space around the stem end, however, must be avoided under any circumstances. Here the invention is set in, in that it is proposed to narrow conically the stem in the proximity of the transition to the patch disc at 9, so that the diameter of the stem immediately at the transition into the patch disc, according to size of the repair body, is the same (in small stem diameters) or only slightly larger (in large stem diameters) than the diameter of the puncture canal. This step has the result that the stem at the end of the pulling force can again expand entirely or at least considerably to its original diameter, so that the danger of the swelling out from the puncture canal in small stem diameters is completely avoided, and in large ones considerably avoided. The secure hold in the puncture canal is not afforded by this step, since the stem is held with strong press fit in the puncture canal with the largest part of its length and particularly in the area of the tire surface.

As already mentioned, the reliability of the repair depends on the very firm seating of the stem in the puncture canal, the pressing having to be in proportion to the size of the puncture canal and corresponding to the stem diameter. Since the invention is concerned especially with the repair of large damages, which according to the views of those skilled in the art cannot be repaired with a stem patch, there results in extremely large damages the situation that on the one hand the contact pressure at the puncture canal is so great that even the diameter reduction by means of cone 9 is insufficient to avoid with certainty the feared ring split; and that furthermore the length of the cone, so far as it should reduce the stem diameter, at the transition to the patch disc, to the puncture canal diameter, would be of a size that the stem is seated in the puncture canal with the required pressure fit not with the largest part of its length but instead only with a relatively small part. In this instance, the length of stem firmly pressed into the puncture canal would be no longer sufficient to guarantee the durability of the repair.

In this connection, it should be noted that cone 9 must represent the surface of a pointed truncated cone in order to achieve a gradual transition between strong pressure fit and diameter evenness between stem and puncture canal, because too short a cone with correspondingly abrupt transition from pressure fit to the described diameter evenness could not prevent the swelling out of the rubber from the end of the puncture canal.

In these instances, the second of the novel characteristics becomes effective, that particularly the stem of the repair body consists of a plurality of layers 10, 11 of rubber of various hardness proceeding in the direction of the stem axis (FIG. 1). These layers are symmetrically disposed about the stem axis, preferably concentrically (FIG. 3) or spirally (FIG. 4) arranged around the stem axis, although a construction of the stem can be realized of planar layers parallel to each other and to a plane enclosing the stem axis.

The layers 10 can be made of a hard rubber mixture of for example 50 to 55 Shore and the layers 11 of a soft mixture with for example 15 to 25 Shore or reversed. In this manner there results a stem construction which realizes the advantages of the stem with a hard core and soft buffer layer respecting the elastic construction of the puncture canal, avoiding an overly great pressure which makes a swelling out at the ends of the puncture canal unavoidable, without having to take into consideration the disadvantages of the known construction, however, that particularly the hard core becomes destroyed after a short run.

Since in the novel layer construction not a hard core with large diameter inserted in a relatively thick buffer layer corresponding to the stem diameter, the mentioned disadvantage of the known form of construction cannot set in, that namely the entire hard core moves freely with each stress within the buffer layer and thus so to speak destroys itself. Indeed, the total of the thin, soft layers give the same elasticity as the known single thick buffer layer, yet the also thin, hard layers situated in between the soft layers can move in a very limited scope, where in addition the movement of a hard layer, modified by the interspaced soft layer, is transmitted only to the directly adjacent hard layers and on further removed layers has absolutely no effect. In this connection, it should be observed that, as already mentioned, in the drawing the layer construction is illustrated in a much exaggerated form in order to be able to illustrate the deformation of the layers. In practice the binding layer 5 has the known and the usual thickness of about 0.5 to 1 mm., while the thickness of the hard layer 10, replacing the damaged tire surface, is about between 1 and 3 mm. The soft buffer layers can be thinner than the hard layers, where the outer layers are about 0.5 to 1 mm. thick, while the more inner layers increase in the forming properties can become increasingly thicker until they have approximately the thickness of the hard layers. Because of technical production grounds, above all the spiral stem cross-section is preferred, to make both the hard as well as the soft layers equally thick over the entire cross-section.

It is particularly advantageous in this layer construction of the stem if the soft layers 11 serving as buffers, as already known with respect to repair bodies for the repairing of rip-shaped damaged areas or small pin holes (German Pat. No. 1,190,825), are produced from a mixture of unvulcanized rubber which contains neither sulfur nor catalyst. These layers, which because of the lack of vulcanization-promoting additives even after the repair and during operation remain unvulcanized are and remain viscous in contrast to the vulcanized elastic layers and are therefore particularly well suited to equalize deformations of the puncture canal during operation. Furthermore, these unvulcanized layers are not subject to the aging process of vulcanized rubber, the latter resulting in that originally soft rubber layers become harder and more brittle in the course of time, so that under certain conditions they no longer can fulfill their buffering function.

Figure 4:
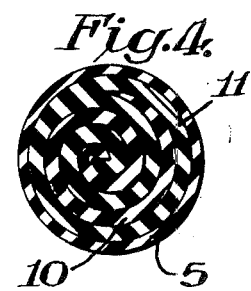
FIG. 4 is a corresponding cross-sectional view through a repair body in another form of this invention.

In such a layer construction of alternating layers of vulcanized and unvulcanized rubber, particularly in a spiral stem, wound of individual layers, according to FIG. 4 it is possible to eliminate a special binding layer, since the materials effecting the vulcanization, brought into the punctured canal prior to the insertion of the repair body, containing the vulcanization liquid, e.g., catalysts, indeed effect the vulcanization of the outermost layer, but leave the further inwardly situated layers unvulcanized.

Of course, just as in the first alternative characteristic of the invention, namely the conical tapering of the transition between stem and patch disc, it is possible in the second characteristic of the layered construction in many instances using only this characteristic to achieve a satisfactory repair, if this concerns relatively small stem diameters. In large stem diameters, however, as already noted above, the combination of both characteristics is more suitable or even necessary in order to make certain of a durable restoration of the damaged part.

Indeed, there is a process known for the repair of large damaged areas in motor vehicle tires (Swiss Pat. No. 425,499) which states that a rubber-like vulcanizable binding material for the insertion of the vulcanization is coated with a self-vulcanizable film and then is rolled up into a roll. This roll, which should functionally correspond to the stem of the invention, is then inserted into a puncture canal in the tire which tapers from inside out and is leveled off at the inner side of the tire in a manner that the inner end of the roll or stopper protrudes over the inner surface of the tire. This protrusion is then processed with the help of a polishing stone as well as by the effects of heat and pressure in such a manner that at the tire interior there results a convex arching. Finally the repair shaft is covered inside with a patch reinforced with fillers.

Even this process does not satisfy the demands of actual practice, since on the one hand it is very cumbersome and on the other hand it is unreliable. For carrying out the process it is necessary to have available a laminated binding material of partially prevulcanized rubber, which vulcanizes in the course of the repair, i.e., a material which has a very limited storage stability, since the vulcanization-aiding constituents contained in the mixture after some time effect a self-vulcanization even in plain storage, making the material useless for the intended purpose.

Even the preparation of the stopper itself is cumbersome and time-consuming, since first a triangular strip is cut off from the laminated material whose length must be so measured that a stopper of the desired thickness results. In this connection, in rolling up the strip previously coated with a sticky film, adhering to hands and tools, care must be taken that no hollow spaces are formed in the stopper and that there result no air pockets which again are starting points for its destruction.

Even the preparation of the puncture canal with its conicity decreasing from inside outwards and the leveled edge is difficult and makes it impossible to employ rotating ring cutters by which even the ends of the destroyed carcass webbing, protruding into the damaged area, are cut off cleanly and smoothly. Such webbing ends protruding into the puncture canal or even fiber ends ripped out by rotating cutters also form starting points of a later destruction of the repair. A further disadvantage is also that in this process a device must be present by means of which the stopper inserted into the puncture canal can be subjected to the effects of heat and pressure.

Finally, the known process fails because it is based upon a false assumption. It is assumed that the convex end of the stopper protruding into the interior of the tire after application of the patch is pressed outwards by the inner pressure in the tire and thus firmly against the leveled edge at the inner end of the puncture canal. This is not true, however, so long there is no stress from outside on the damaged area. In this instance namely, for example in riding over a stone, the stopper is pressed inwards. This pressure, which because of the disrupted carcass webbing continues inward undisturbed by the stopper forming a uniform vulcanized mass, is now even increased by the elasticity of the compressed convex part of the stopper, and since it affects the center part of the patch which has the greatest rigidity anyway, due to the crossing reinforcing inserts, it leads directly to a loosening of the patch in the proximity of the puncture canal and to the annular hollow space whose formation the invention avoids.

Other pertinent patents in this field are German Pat. No. 1,190,835, German published application Nos. 1,155,992 and 1,239,953; British Pat. No. 240,765 and Swiss Pat. No. 425,499.

As seen in FIG. 1, the surface of the patch disc 2 coming into contact at the interior side of the tire is curved in a known manner (British Pat. No. 240,765), i.e., the curvature of the tire in longitudinal direction and from rim to rim to conform with the tire interior. In this construction not only is there no undesired tension tending to create a hollow space in the installation of the novel repair body in the tread surface of the tire by the elastic forming of the patch disc, but it is also possible to repair damages in the side walls of the tire with the aid of a repair body constructed in such a manner.

Figure 5:
FIG. 5 is a perspective view of a cut-open compensating ring.

Although the combination of the above-mentioned novel alternative characteristics enables a simple and lasting repair of damages of which it was previously assumed, because of their size, could be repaired only with the usually cumbersome processes of coning, filling in and hot vulcanizing, it is still possible for an annular hollow space to form between the stem and patch disc for example when carelessly carrying out the repair, in extremely large damaged areas, in using the repaired tire under particularly difficult operating conditions, e.g., in giant tires for heavy construction machines, or in tires with a very thin and flexible carcass. In order to assure durability of repair even in these infrequent instances according to the invention, a compensating ring 12, made separately from the rest of the repair body, as illustrated in FIG. 5, consisting of a very soft or even of an unvulcanized rubber mixture, which prior to the insertion of the repair body on stem 1 is pushed up to the installation of the patch disc, and which after the insertion, as seen from FIG. 6, fills in the space in the immediate proximity of the puncture canal. Insofar as only part of the ring consists of an unvulcanized rubber mixture, it can be coated with a thin binding layer (not illustrated) in the usual manner.

In FIG. 6 shaft 1 of the repair body is illustrated as up to the binding layer 5 uniformly consisting of a hard and rub-off fast rubber mixture, yet of course ring 12 can also be used in combination with a repair body with layer construction of the stem of the type illustrated in FIG. 1.

The introduction of the novel repair body for the repair of large damaged areas and in tires for heavy construction and earth-moving machines, where extreme stresses of the repaired damaged areas occur, leads to the fact that preferably the repair bodies during the finishing are made of separate elements, namely stem and patch disc, and only later fitted together to form a unitary body. This fitting together can take place either in the production operation or in the operation of large-scale buyers, there if necessary just prior to the insertion of the repair body into the damaged area.

It is apparent that this method is not only advantageous in production but also in shipment, since in packing large repair bodies in their insertion-ready shape, considerable empty spaces between the stems is unavoidable, while in the separate shipping of the stems and patch discs, these empty spaces can be reduced to a minimum.

On the other hand, the novel cross section reduction in the area of the transition from the actual stem 1 to the patch disc 2 reduces the contact surface, provided for the binding of the stem with the patch disc, which can amount up to 25 percent of the surface which exists in a cylindrical stem. The thus resulting weakening of the binding between stem and patch disc can lead to a loosening of the stem in operation, even if only during extreme stress or with an inferior joining of stem and patch disc when this is undertaken by the buyer.

In order to eliminate with certainty even this possibility, it is proposed by the invention in multi-sectionally finished repair bodies to install the binding surface between stem and patch disc from the plane of the smallest stem cross-section. For this purpose, there are two possibilities:

1. The binding surface is installed into the patch disc; in other words the stem is provided with a small part of the patch disc, where the diameter of this disc addition can be greater than the largest diameter of the stem (FIGS. 7–8); and 2. The reverse of the above-described step, where the patch disc is provided with a projection in the direction of the stem, so to speak with a stem stump (FIG. 9).

Figure 7:
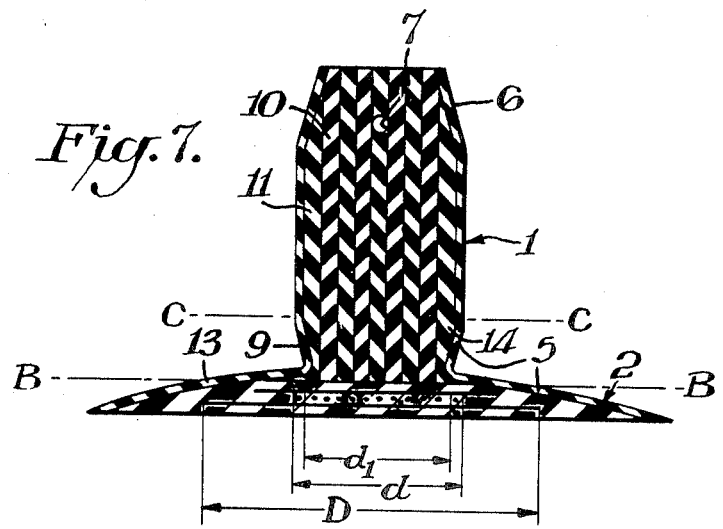
FIGS. 7–9 are longitudinal sections through further forms of construction of novel repair bodies.

FIG. 7 differs from FIG. 1 only in that the separation plane or juncture between stem 1 and patch disc 2 does not proceed approximately along line A—A, as there indicated, but is placed in the patch disc, as indicated by line B—B. Here stem 1 is provided with a disc-like addition 13, whose diameter D is greater than the largest diameter $d$ of stem 1 and of course is greater than the smallest diameter $d_1$. The large binding surface corresponding to diameter D assures a firm binding between stem and patch disc even under extreme operating requirements.

Of course this possibility can be reversed in a simple manner in that the lower part 14 of the stem is constructed as a projection of the patch disc, i.e., the binding surface following about line C—C.

Figure 8:
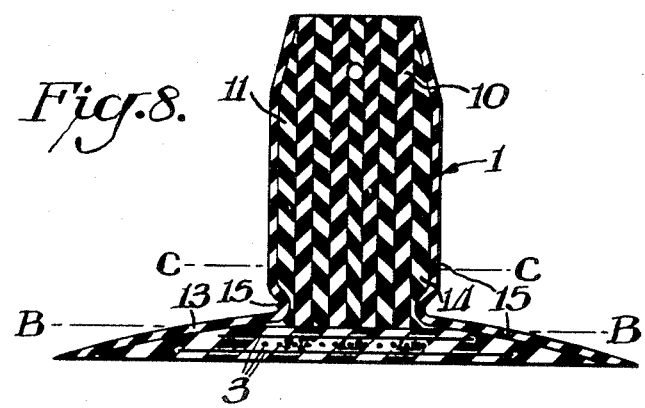
Figure 9:
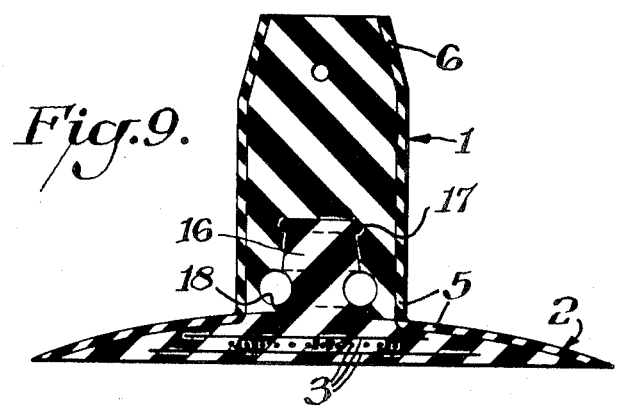

The form of construction of FIG. 8 differs from that of FIG. 7 only in that instead of the conical tapering at 9 an annular recess 15 is provided. Even in this instance the binding surface between stem and patch disc can follow line B—B.

In the form of construction of FIG. 9, the patch disc has a lug-shaped projection 16 in the direction of the stem axis which in the assembly of parts 1 and 2 is inserted into a corresponding recess in the stem.

An annular rim 17 can be provided at the end of the projection 16 and supports, in coaction with another corresponding depression in the stem, the unity of parts 1 and 2 during their binding, e.g., in the way of cold vulcanization.

Instead of the conical tapering or the annular recess at the outer end of the stem, in this instance grooves can be provided in the interior of the stem, and in particular either in the recess in the stem or in the lug-shaped addition to the patch disc or even in both parts, so that a ring or annular chamber 18 results with basically any desired cross section circular in the illustrated example, which effects the reduced material pressure in the area of the transition between stem and patch disc strived for in the invention and thus assures the secure adherance of the repair body to the interior side of the tire exactly in this area.

Of course in this binding type also there can be achieved between stem and patch disc the required tension reduction by the corresponding recesses or taperings at the exterior of the stem instead of the hollow spaces in the interior of the stem, as this is possible in constructing the stem not of a uniform rubber mixture as illustrated but if necessary to provide a layer construction of the stem, avoiding hollow spaces, taperings, etc.

On the other hand, under certain conditions the forms of construction of FIGS. 7 and 8 can of course also have a stem of a uniform rubber mixture if the tension equalization, achieved by the tapering at 9 or the recess 15, is sufficiently great.

As obvious, the individual characteristics of the invention, partially individually and partially in combination, serve the uniform purpose to prohibit with certainty that even in large and largest repair areas and at extreme stress to the repaired tire at the transition between stem and patch disc a hollow space resulting in the loosening of the patch disc and the destruction of the tire, something which is the case even when in multi-sectional preparation of the repair body, the stem loosens from the patch disc after repair. In the preceding disclosure there are given certain numbers, at what diameter what combination of the novel characteristics is required, these statements, however, should be considered only as guides, since the repair—especially of large damaged areas is influenced by so many factors that a determination of specific parameters to cover all possible applications of the invention would not be possible. These guidelines, however, also apply to coming on the market in the future, just as those already on the market, although they vary so much in their construction, rigidity, materials used, purpose of use, and size.

Even the operating conditions to be expected in this regard are to be taken into consideration. Thus, it is possible for example to patch in a normal PKW tire a damaged area with a prepared puncture canal of about 50 to 55 mm. diameter with a repair body whose stem is constructed either conically tapered or in layers, while a damaged area of similar size in a heavy-load motor vehicle capable of cross-country travel which is used in the roughest field operation requires the combination of both above-named characteristics, but for the sake of safety requires also the compensating ring according to FIGS. 5 and 6.

The statements contained in the above disclosure doubtlessly give each experienced tire specialist the possibility of choosing for each individual instance the most suitable application of the novel characteristics, individually or in combination, where in the case of doubt the combination is to be preferred.

What is claimed is:

1. A tire body adapted to permanently seal tire injuries of a size exceeding nail punctures comprising, in combination therewith, a tire having an injury extending from its tread through its interior surface, said repair body comprising a stem for plugging the injury, a disclike reinforced patch secured to said stem at one end of said stem fitting against said interior surface of the tire body to restore the strength of the tire body impaired by the injury, said stem being of uniform cross-section over the greater part of its length for forming a tight pressure fit with the considerably smaller cross-sectioned tire injury wall, said uniform cross-section portion of said stem filling substantially the entire injury, and said stem being of laminate structure with a plurality of soft rubber layers and a plurality of hard rubber layers alternatively arranged for replacing the missing tire tread and for compensating for excess pressure created by said stem being forced into a tight pressure fit with the tire injury wall to prevent the creation of hollow spaces between said patch and the tire body, and said stem tapering inwardly at the juncture with said patch to further compensate for excess pressure.

2. A repair body as set forth in claim 1 wherein said layers are spirally arranged about said axis.

3. A repair body as set forth in claim 1 wherein said layers are concentrically arranged about said axis.

4. A repair body as set forth in claim 1 wherein the end of said stem remote from said patch is conically tapered and includes tool receiving means.

5. A repair body as set forth in claim 1 wherein said layers are of vulcanized rubber having alternate Shore hardnesses.

6. A repair body as set forth in claim 5 wherein the alternate Shore hardnesses are 15–25 and 50–55 Shore.

7. A repair body as set forth in claim 1 wherein said layers consist of alternately vulcanized and unvulcanized rubber.

8. A repair body as set forth in claim 1 wherein said stem and said patch are manufactured separately and united together before use to form an integral repair body with the plane of juncture being spaced from the plane of the smallest cross-sectional area of said stem.

9. A repair body as set forth in claim 8 wherein the lower end of said stem is disc-shaped, and the endface of the disc with the area of connection to said patch being greater than said uniform cross-sectional area.

10. A repair body as set forth in claim 8 wherein said patch has a projection extending into said stem, the area of connection of said stem with said patch being at least as great as the diameter of said stem at said uniform cross-sectional area.

11. A repair body as set forth in claim 10 wherein said projection fits in a complementary recess in said stem.

12. A repair body as set forth in claim 11 wherein said reduced cross-section is produced by a hollow chamber formed by a groove between said projection and said stem recess in the proximity of said juncture.

13. A repair body as set forth in claim 11 wherein said projection has an annular rim engaging a corresponding depression in said stem.

14. A repair body as set forth in claim 13 wherein said reduced cross-section is produced by a hollow chamber formed by a groove between said projection and said stem recess in the proximity of said juncture.

15. A tire repair body as set forth in claim 1 wherein said layers are alternately vulcanized and unvulcanized rubber.

16. A repair body as set forth in claim 1, wherein the diameter of said stem at said uniform cross-section is greater than about 50 mm.

17. A repair body as set forth in claim 1 wherein a binding layer is provided on the exposed interior surface of said patch disposed in contact with the tire interior, said binding layer being curved and conforming to the tire curvature in the formation direction and form rim to rim.

18. A tire repair body adapted to permanently seal tire injuries of a size exceeding nail punctures comprising, in combination therewith, a tire having an injury extending from its tread through its interior surface, said repair body comprising a stem for plugging the injury, at least a portion of said stem being made of a hard rubber to replace the missing tire tread, a disclike reinforced patch secured to said stem at one end of said stem fitting against said interior surface of the tire body to restore the strength of the tire body impaired by the injury, said stem being of uniform cross-section over the greater part of its length forming a tight pressure fit with the considerably smaller cross-sectioned tire injury wall, said uniform cross-section of said stem filling substantially the entire injury and said stem tapering inwardly at the juncture with said patch to compensate for excess pressure created by said stem being forced into a tight pressure fit with the tire injury wall to prevent the creation of hollow spaces between said patch and the tire body.

19. A repair body as set forth in claim 18 including a rubber compensating ring inserted over said stem at said juncture, said ring being coated with a self-vulcanizing binding layer.

20. A repair body as set forth in claim 18 wherein said stem and said patch are manufactured separately and united together before use to form an integral repair body.

21. A tire repair body adapted to permanently seal tire injuries of a size exceeding nail-punctures comprising a stem for plugging the injury and a disclike patch to restore the strength of the tire body impaired by the injury; said stem being over the greater part of its length, of a uniform cross-section considerably larger than the corresponding cross-section of the injury, to ensure a tight pressure fit; pressure compensating means being provided to compensate excess pressure near the juncture where the stem merges into said patch; said compensating means comprising said stem being formed of a plurality of rubberlike layers symmetrically disposed about the axis of said stem and being of varying degrees of hardness; and said layers are of vulcanized rubber having alternate Shore hardnesses of 15–25 and 50–55.

22. A tire repair body adapted to permanently seal tire injuries of a size exceeding nail-punctures comprising a stem for plugging the injury and a disclike patch to restore the strength of the tire body impaired by the injury; said stem being over the greater part of its length, of a uniform cross-section, considerably larger than the corresponding cross-section of the injury, to ensure a tight pressure fit; pressure compensating means being provided to compensate excess pressure near the juncture where the stem merges into said patch; said compensating means comprising a reduced cross-section of said stem near said junction, and said compensating means further comprising said stem being formed of a plurality of rubberlike layers symmetrically disposed about the axis of said stem and being of varying degrees of hardness; and said layers being of vulcanized rubber having alternate Shore hardness of 15–25 and 50–55.

* * * * *